United States Patent
Takasaki

(10) Patent No.: US 9,362,806 B2
(45) Date of Patent: Jun. 7, 2016

(54) BUS BAR MODULE OF ROTATING ELECTRIC MACHINE

(75) Inventor: Akira Takasaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 23 days.

(21) Appl. No.: 14/347,361

(22) PCT Filed: Sep. 27, 2011

(86) PCT No.: PCT/JP2011/072095
§ 371 (c)(1),
(2), (4) Date: Mar. 26, 2014

(87) PCT Pub. No.: WO2013/046340
PCT Pub. Date: Apr. 4, 2013

(65) Prior Publication Data
US 2014/0232215 A1    Aug. 21, 2014

(51) Int. Cl.
*H02K 3/38* (2006.01)
*H02K 11/00* (2016.01)
*H02K 3/50* (2006.01)

(52) U.S. Cl.
CPC .............. *H02K 11/0094* (2013.01); *H02K 3/38* (2013.01); *H02K 3/50* (2013.01); *H02K 2203/09* (2013.01)

(58) Field of Classification Search
USPC .......................................................... 310/71
See application file for complete search history.

(56) References Cited

U.S. PATENT DOCUMENTS

| | | | |
|---|---|---|---|
| 5,633,542 A * | 5/1997 | Yuhi et al. | 310/40 MM |
| 8,035,263 B2 * | 10/2011 | Kienzler et al. | 310/71 |
| 2006/0068617 A1 * | 3/2006 | Migita et al. | 439/76.2 |
| 2006/0138883 A1 * | 6/2006 | Yagai et al. | 310/71 |
| 2010/0148615 A1 * | 6/2010 | Sasaki et al. | 310/180 |
| 2010/0327709 A1 * | 12/2010 | Minato et al. | 310/68 D |

FOREIGN PATENT DOCUMENTS

| | | |
|---|---|---|
| CN | 101728888 A | 6/2010 |
| EP | 2 182 614 | 5/2010 |
| JP | 63-51545 | 4/1988 |
| JP | 5-1174 | 1/1993 |
| JP | 5-135820 | 3/1993 |
| JP | 2003-134759 | 5/2003 |
| JP | 2006-101614 | 4/2006 |
| JP | 2008-301561 | 12/2008 |

OTHER PUBLICATIONS

English language translation of JP 5-1174, dated Jan. 8, 1993.

* cited by examiner

*Primary Examiner* — Naishadh Desai
(74) *Attorney, Agent, or Firm* — Finnegan, Henderson, Farabow, Garrett & Dunner, LLP

(57) ABSTRACT

This bus bar module (26) is created by integrally forming at least one coil bus bar with a power line bus bar by means of resin molding, said coil bus bar for connecting conductive coil wires together, and said power line bus bar for connecting the conductive coil wires with a power line. The power line bus bar (32) is supported on a support portion (34) that extends from a bus bar module main body (28). The power line bus bar penetrates through a beam (44) of the support portion. The portion of the power line bus bar embedded inside the beam (44) has characteristically shaped portions (56) extending in the width direction of this bus bar.

2 Claims, 6 Drawing Sheets (a)　　　　　(b)

BUS BAR MODULE OF ROTATING ELECTRIC MACHINE

CROSS-REFERENCE TO RELATED APPLICATIONS

This application is a national phase application of international application No. PCT/JP2011/072095, filed Sep. 27, 2011, the content of which is incorporated herein by reference.

TECHNICAL FIELD

The present invention relates to a bus bar module in which a bus bar for connecting coil wires of a rotating electric machine to each other and a bus bar for connecting the coil wires to power lines are integrated by mold forming.

BACKGROUND ART

There have been known an electric motor which converts electrical energy to rotational movement energy, a generator which converts rotational movement energy to electrical energy, and an electric device which functions as both an electric motor and a generator. These electric devices will be hereinafter referred to as rotating electric machines.

A rotating electric machine has two members which are located on the same axis and rotate with respect to each other. Normally, one member is fixed, while the other member rotates. By locating a coil on the fixed member (stator) and supplying electrical power to this coil, a rotating magnetic field is formed. The other member (rotor) rotates by interaction with this rotating magnetic field. The coil located on the stator is formed, for example, by attaching coil wires formed to have a predetermined shape to the stator and then connecting these coil wires to each other.

The below-listed Patent Document 1 discloses a technique of arranging a plurality of coils along the circumferential direction of a stator and connecting coil wires forming each coil via a bus bar. The plurality of bus bars are contained in a groove formed in a rail member, thereby forming a module.

CITATION LIST

Patent Documents

Patent Document 1; JP 2008-301561 A

SUMMARY OF INVENTION

Technical Problem

In a bus bar module in which at least one coil bus bar for connecting coil wires of a coil to each other and at least one power line bus bar for connecting the coil wires to power lines are integrated, by resin molding, the coupling strength between the power line bus bar and a resin may be insufficient.

The objective of the present, invention is to rigidly support the power line bus bar.

Solution to Problem

A bus bar module of a rotating electric machine according to the present invention has at least one coil bus bar which connects coil wires to each other, the coil wires being attached to a stator core of the rotating electric machine, and at least one power line bus bar which connects the coil wires to power lines, the power line bus bar being made of a flat plate member, and the coil bus bar and the power line bus bar are formed by mold forming using a resin material. The bus bar module has a bus bar module main body containing the coil, bus bar, and a power line bus bar support portion extending outward from the bus bar module main body and supporting the power line bus bar. The power line bus bar support portion has a coupling member through which the power line bus bar penetrates and which contains a portion of the power line bus bar and is coupled with that portion of the power line bus bar. The power line bus bar has a characteristically shaped portion in the portion contained in the coupling member, and the characteristically shaped portion, extends in a direction, the direction intersecting with a direction in which the power line bus bar penetrates through the coupling member and being within a plane defined by a plate surface of the power line bus bar.

Specifically, the characteristically shaped portion may be a protrusion protruding from a side surface of the power line bus bar in the width direction. The characteristically shaped portion may also be an elongate hole formed in the power line bus bar. The characteristically shaped portion may further be a notch formed in the side surface of the power line bus bar in the width direction.

The power line bus bar support portion may have two arms extending outward from the bus bar module main body, and a beam for connecting between these two arms. In this case, the power line bus bar penetrates through this beam, and this beam functions as the above-described coupling member.

The portion of the power line bus bar to which the power line is connected and the portion of the power line bus bar to which the coil wires are connected may be located on opposite sides with respect to the coupling member.

The power line bus bar may have a general U-shape. In this case, the bottom portion of the U-shape is contained in the coupling member. The U-shape may be formed by bending an elongated flat plate member with respect to a plane which is orthogonal to the plate surface so as to include the center line in the longitudinal direction of the member.

The bus bar module may be located adjacent to the stator in the rotational axis line direction of the rotating electric machine.

Advantageous Effects of Invention

The characteristically shaped portions such as the protrusion and the elongate hole can enhance the coupling between the power line bus bar and the power line bus bar support portion, thereby suppressing vibration of the power line bus bar.

DESCRIPTION OF EMBODIMENT

Figure 1:
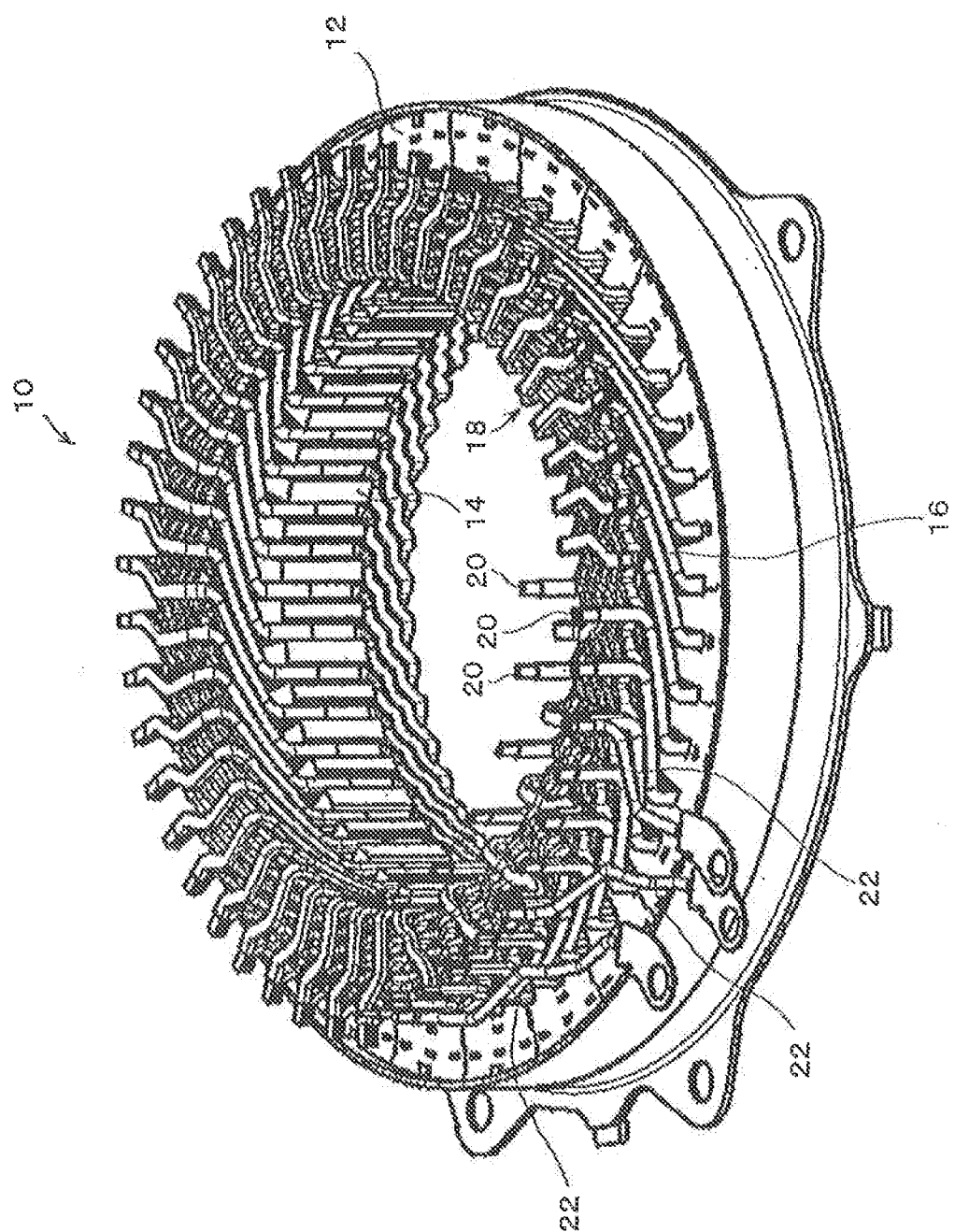
FIG. 1 shows a perspective view of a stator of a rotating electric machine.

Embodiments of the present invention will be described below by reference to the drawings. FIG. 1 shows an exterior appearance of a stator 10 of a rotating electric machine, but it does not show a bus bar module, which will be described later. The stator 10 has a stator core 12 having a general circular or cylindrical shape and has teeth 14 functioning as magnetic poles on the inner circumference of the stator core 12 along the circumferential direction. A stator coil 18 is attached to the stator core such that coil wires 16 are wound around the teeth 14, In this embodiment, the stator coil 18 is formed by inserting a plurality of coil wires 16 formed to have a predetermined shape, into slots which are spaces between the teeth 14, and welding the coil wires 16 to each other or connecting the coil wires 16 to each other via a conductor such as a bus bar. More specifically, the coil wires 16 are welded and connected directly to each other to thereby form a partial coil functioning as a part of the stator coil 18, and ends of the coil wires 16 of these partial coils are connected using conductors such as the bus bars, which are not the coil wires, to thereby form, the stator coil 18.

The stator 10 has a circular or cylindrical shape even when the stator coil 18 is attached to the circular or cylindrical stator core 12. Hereinafter, the terms "circular" and "cylindrical" describing the shape of the stator and the like will be simply referred to as "circular," for the sake of simplicity. By supplying electrical power to the stator coil 18, a rotating magnetic field is formed in the space inside the circle of the stator 10, and the rotor is caused to rotate by interaction with this rotating field. This rotational axis line of the rotor serves as the rotational axis line of the rotating electric machine, and this axis line is identical to the center axis line of the circle of the stator 18. The direction in which this rotational axis line of the rotating electric machine extends; that is, the direction in which the center axis line of the circle of the stator 10 extends, will be referred to as the "rotational axis line direction."

As shown in FIG. 1, the ends of the coil wires protrude upward from the stator coil 18 along the rotational axis line direction. These ends of the coil wires extending from the stator coil 18 will be referred to as coil-wire end extension portions 20. In the stator 10, a pair of partial coils is provided for each of a U-phase, a V-phase, and a W-phase, and total of twelve coil wire end extension portions 20, which are ends of the partial coils, are provided. The coil wire end extension portions 20 are electrically connected to each other in each phase, and the ends of the coil wire end extension portions 20 on the neutral point side are electrically connected to each other. Further, a power line 22 for supplying three-phase AC power is connected to each one of the coil wire end extension portions 20 of the U-phase, the V-phase, and the W-phase, via a bus bar (described later). When the rotating electric machine generates power, the power line 22 also functions to deliver the generated power to the outside.

Figure 2:
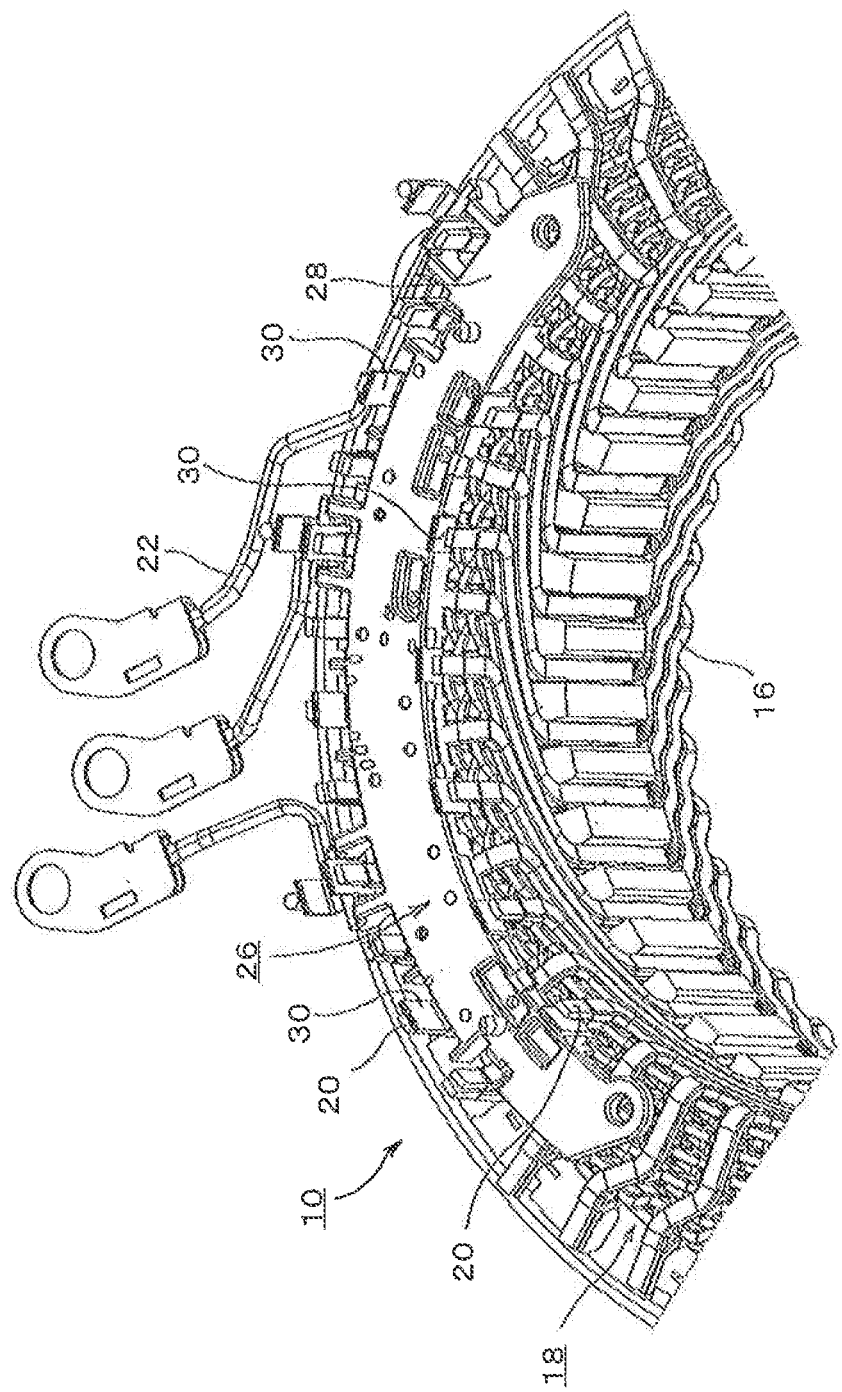
FIG. 2 shows a bus bar module attached to the stator.
Figure 3:
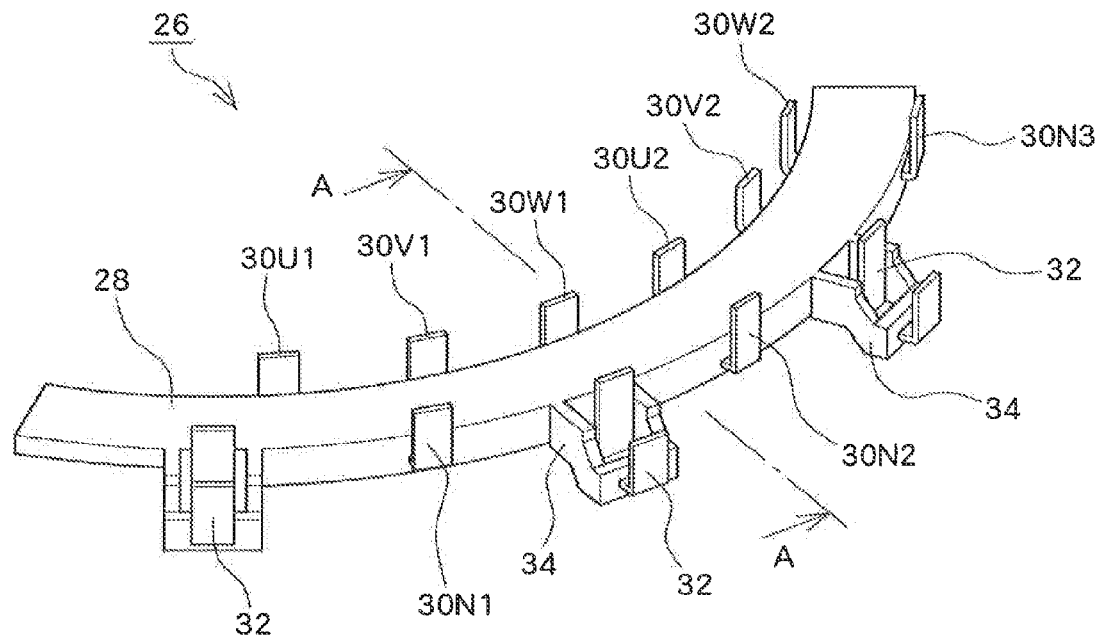
FIG. 3 shows a perspective view of the bus bar module alone.

FIG. 2 and 3 show a bus bar module 26 which integrates a plurality of bus bars made of a conductive material to connect the coil wires 16 for each phase, FIG. 2 shows the bus bar module 26 attached to the stator 10, while FIG. 3 shows a schematic view of the bus bar module 26 alone.

The bus bar module 26 is located adjacent to the side portion of the stator 10, and in particular adjacent to the stator coil 18, in the rotational axis line direction. The bus bar module 26 has a bus bar module main body 28 extending in a circular shape along the circular shape of the stator 10, and terminals 30 protruding from this module main body 28 and being connected to the coil wire end extension portions 20. The bus bar module main body 28 contains the plurality of bus bars extending along the arc of this module main body 28, and the ends of these bus bars protrude from the bus bar module main body 28, to thereby form the terminals 30. Each of these terminals 30 will be referred to as a bus bar end extension portion 30. The bus bar end extension portions 30 protrude from the side surface of the bus bar module main body 28; that is, the surface directed, to the direction intersecting with the longitudinal direction of the bus bar module main body 28. In the stator 10, the bus bar end extension portions 30 protrude from the opposing side surfaces of the bus bar module main body 28, which are the side surfaces on the arc-shaped outer and inner circumferential sides of the bus bar module main body 28.

Further, there are provided support portions 34 which protrude from the bus bar module main body 28 to support bus bars 32 connected to the power lines 22 by welding, etc. (see FIG. 3). These bus bars 32 will be hereinafter referred to as power line bus bars 32. Three power line bus bars 32 are provided so as to correspond to the number of the phases. The size of the bus bar module main body 28 in the radial direction; that is, the width of the bus bar module main body 28, is equal to or less than the width of the stator coil 18 in the radial direction, and the width of the entire bus bar module 26 including the support portions 34 is within the width of the stator core 12.

The stator coil 18 is formed by connecting between two partial coils for each phase using a bus bar. One end of each of coil wires of the two partial coils is connected to the bus bar. The other end of the coil wire of one partial coil is connected to the neutral point, while the other end of the coil wire of the other partial coil is connected to the power line. The bus bar for connecting the coil wires to each other to form the stator coil and the bus bar for forming the neutral point of the stator coil will be referred, to as coil bus bars 36 (see FIGS. 4 and 6).

The connection relationship between the coil bus bar and the coil wires will be described in more detail by reference to FIG. 3. Among the bus bar end extension portions 30, those connected to the U-phase coil wires are indicated as 30U1 and 30U2; those connected to the V-phase coil wires are indicated as 30V1 and 30V2; and those connected to the W-phase coil wires are indicated as 30W1 and 30W2. The terminals connected to the ends of the coil wires on the neutral point side in each phase are indicated as components 3GN1, 30N2, and 30N3. In other words, in one of the two partial coils of the U-phase, one end of this partial coil is connected to the bus bar end extension portion 3GU1, while the other end is connected to the bus bar end extension portion 30N1 on the neutral side. In the other partial coil, one end of the coil wire is connected to the bus bar end extension portion 30U2, while the other end is connected to the power line 32. The partial coils in the V-phase and the W-phase are also connected in a similar fashion.

The support portions 34 for supporting the power lines 32 are provided on the outer circumferential side of the bus bar module 26. As shown in FIG. 3, the power line 32 is supported by the support portion 34 at a position separated from the bus bar module main body 28, The power line bus bar 32 has, for example, a general U-shape. The U-shape is formed by bending an elongated flat plate shaped member with respect to a plane which includes the center line extending in the longitudinal direction of this member and is orthogonal to the plate surface of this member. One straight portion of the U-shape is connected to the power line 22, and the other straight portion is connected to the other one of the coil wires of each phase. The straight portions on the right and left sides of the U-shape may have different lengths.

Figure 4:
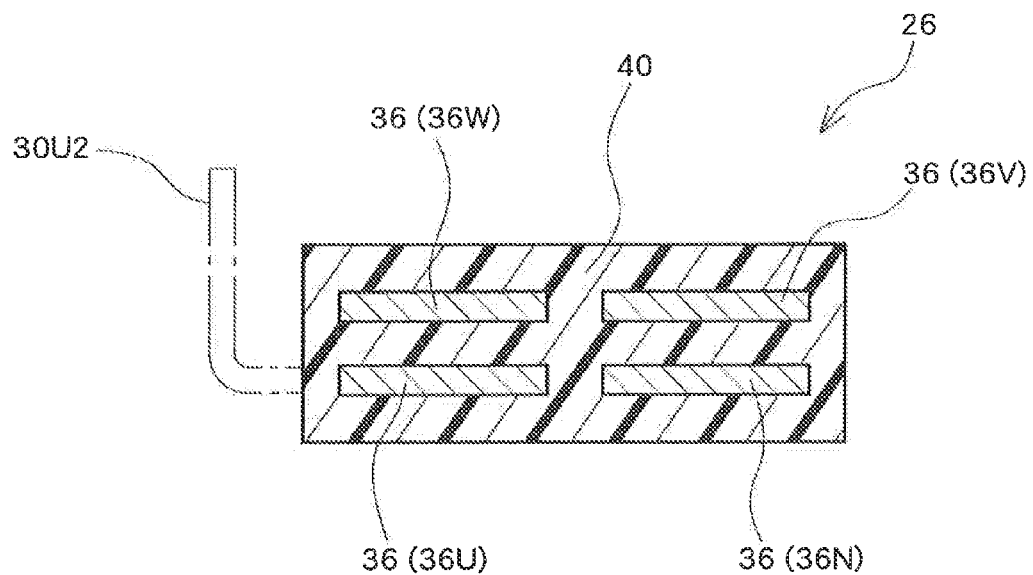
FIG. 4 is a cross sectional view of the bus bar module, taken along line A-A of FIG. 3.
Figure 5:
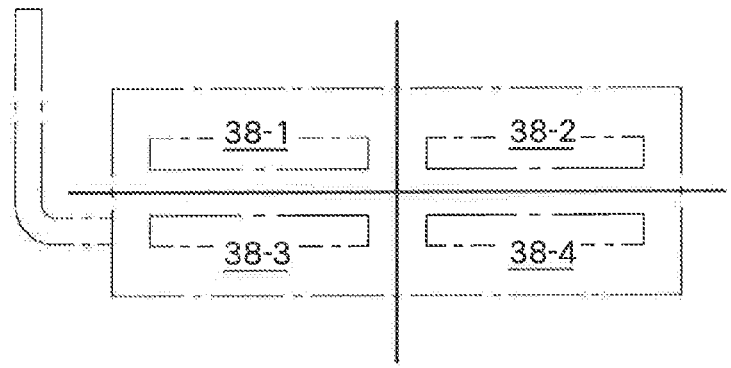
FIG. 5 shows segments 38 in which the bus bars are contained.

FIG. 4 shows a cross sectional view of the bus bar module 26 at a position where four coil bus bars 36 respectively corresponding to the U-phase, the V-phase, and the W-phase and the neutral point are arranged in parallel, which is, for example, taken along line A-A in FIG. 3. All of the coil bus bars 36 have a flat plate shape and have an elongated shape to connect predetermined coil wires to each other. The four coil bus bars 36 are arranged in the 2×2 arrangement including two layers vertically and two rows horizontally. The vertical direction will be herein defined as a rotational axis line direction of the rotating electric machine, and the side near the stator and the side far from the stator will, be described as "down" and "up," respectively. In addition, the horizontal direction will be defined as a direction orthogonal to the rotational axis line; that is, the radial direction of the rotating electric machine, and left and right will be described as the "inside" and the "outside" of the rotating electric, machine, respectively. These directions are employed for convenience, and therefore, they do not relate to directions and orientations in the actual arrangement in the device. Further, when the four coil bus bars 36 need to be distinguished from each other, the coil bus bars of the U-phase, the V-phase, and the W-phase will be respectively described as 36U, 36V, and 36W, and the coil bus bar forming the neutral point will be described as 36N. As shown in the figure, the U-phase bus bar 36U is located in the lower left row; the V-phase bus bar 36V is located in the upper right row; the W-phase. bus bar 36W is located in the upper left row; and the neutral point bus bar 36N is located in the lower right row. Further, each one of the four areas in the 2×2 arrangement will be described as a segment 38. As shown in FIG. 5, among the four segments, the segment, in the upper left row will be referred to as a segment 38-1; the segment in the upper right row will be referred to as a segment 38-2; the segment in the lower left row will be referred to as a segment 38-3; and the segment in the lower left row will be referred to as a segment 38-4.

The bus bar module 26 includes an insulating member 40 for insulating the coil bus bars 36 from each other and covering the coil bus bars 36 to insulate them from the outside. The insulating member 40 is, for example, a resin molded product, and contains the coil bus bars 36U, 36V, 36W, and 36N by mold forming to integrate them. Although the insulating member 40 is shown in an integrated fashion in the figure, it may be divided into two or more parts according to necessity in form shaping. For example, the cross shape in the four rectangles in the center of the insulating member 40 may be first formed. The coil bus bars may be arranged with respect to this cross-shaped part, and the outer rectangular portion may be formed by further resin-molding them. A material of the insulating member 40 may be a general-purpose plastic. Engineering plastic and super engineering plastic may also be adopted according to the usage environment, etc.

Figure 6:
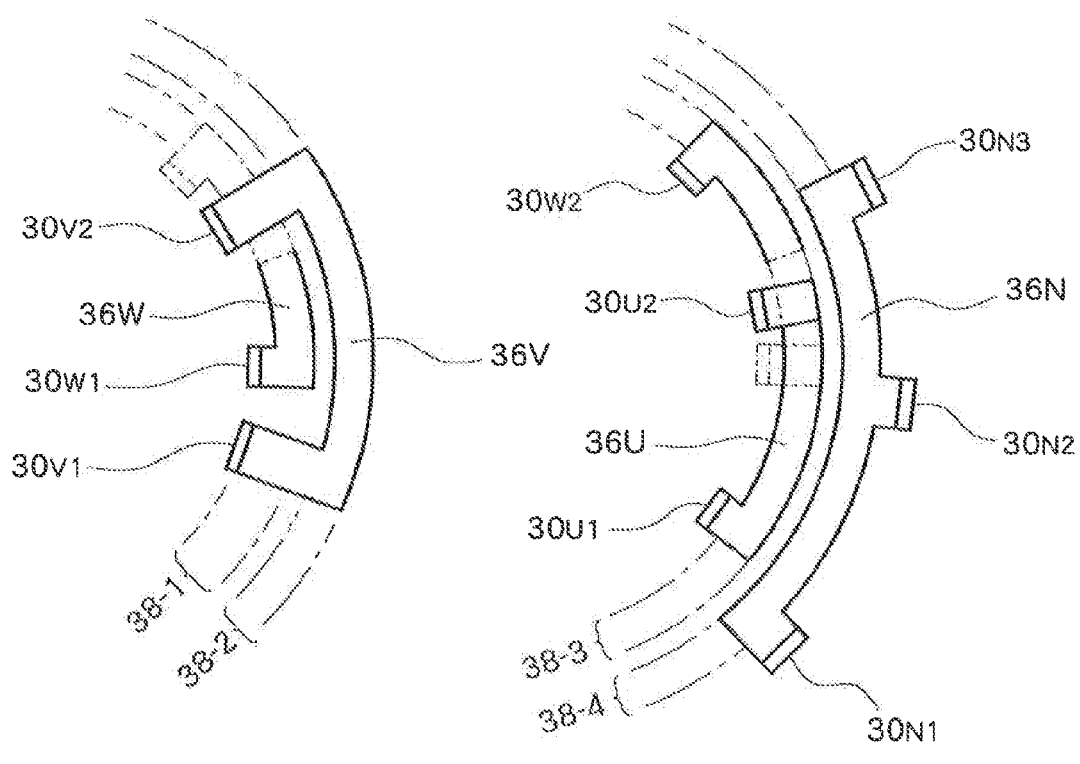
FIG. 6 shows shapes of the bus bars and their arrangement in the bus bar module.

FIG. 6 shows individual shapes of the coil bus bars 36U, 36V, 36W, and 36N. FIG. 6(a) shows the upper layer; that is, a layer to which the segments 38-1 and 38-2 belong, while FIG. 6(b) shows the lower layer; that is, a layer to which the segments 38-3 and 38-4 belong. The individual coil bus bars 36U, 36V, 36W, and 36N are made by forming the flat plate shaped members so as to have an elongated shape; more specifically, a general arc shape, and the plate surface is located within the plane formed by the arc. The bus bar end extension portions 30 are provided at the both ends of the arc, or at the both ends and the intermediate position of the arc.

The U-phase bus bar 36U is located in the segment 38-3 on the lower left side. The V-phase bus bar 36V is located on the upper side layer, and it starts from the terminal 30VI, passes across the segment 33-1 on the left side, extends along the segment 38-2 on the right side, passes across the segment 38-1 on the left side again, and reaches the terminal 30V2. The W-phase bus bar 36W starts from the terminal 30W1, extends along the segment 38-1, moves from the upper layer to the lower layer at the position after the position of the terminal 30U2, extends along the segment 38-3, and reaches the terminal 30W2.

The neutral point bus bar 36 extends along the segment the lower right side. As such, the four coil bus bars 36 are arranged such that two coil bus bars are overlapped vertically in two layers and arranged horizontally in parallel within, the bus bar module main body 28.

FIG. 1 shows details of the support portion 34 for supporting the power line bus bar 32 of the bus bar module 26 and its surrounding structure. The support portion 34 has two arms 42 extending outward from the outer circumferential, side of the bus bar module main body 28, and a beam 44 connecting between tips of these arms 42, The two arms 42 and the beam 44 form a U-shape, and both ends of the U-shape are connected to the bus bar module main body 28. The support portion 34 is formed simultaneously when the bus bar module main body 28 is formed by molding. The power line bus bar 32 is located so as to intersect with the beam 44. The power line bus bar 32 penetrates through the beam 44, to thereby allow the beam 44 to contain a part of the power line bus bar 32 and to be connected with the power line bus bar 32. In other words, the support portion 34 is connected to the power line bus bar 32 in the beam 44. As described, the power line bus bar 32 has the U-shape, and a bottom portion 46 of the U-shape intersects with the beam 44 and penetrates therethrough. A straight portion 48 of the U-shape on the bus bar module main body 28 side extends upward through the space surrounded by the arms 42, the beam 44, and the bus bar module main body 28. The coil wire 16 extends adjacently along this straight portion 48 of the U-shape, and the coil wire 16 and the straight portion 48 are connected to each other by welding, etc. A straight portion 50 on the other side of the U-shape is connected to the coil wire 22 by welding, etc.

Figure 7:
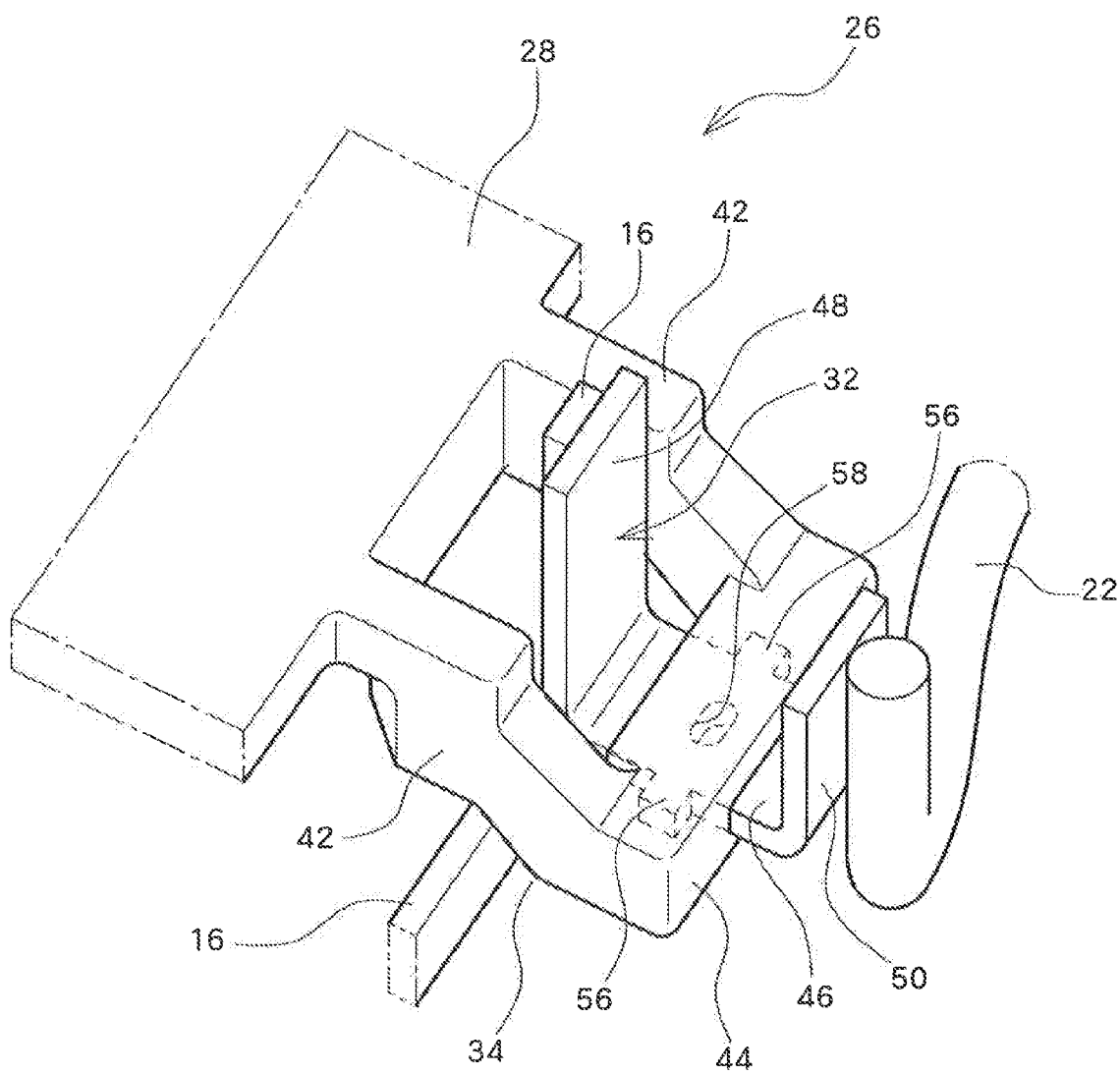
FIG. 7 shows a perspective view of a structure around the power line bus bar support portion.
Figure 8:
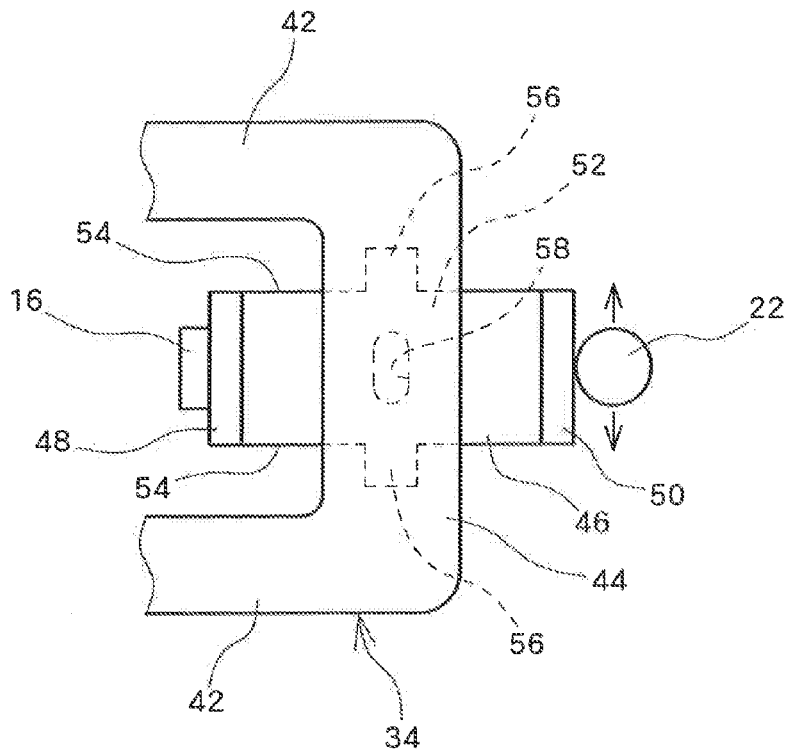
FIG. 8 shows a plan view of the structure around the power line bus bar support portion.

FIG. 8 shows a simplified view of FIG. 7 viewed from above. The power line bus bar 32 has a portion 52 which is contained or embedded in the beam 44. In the following description of the shape of this contained portion 52, a direction in which the power line bus bar 32 extends (the horizontal direction in FIG. 8) will be referred to as a longitudinal direction, and a direction which is orthogonal to the longitudinal direction and is within a plane defined by the plate surface of the flat plate shape will be referred to as a width, direction (the vertical direction in FIG. 8). Further, a direction which is orthogonal to the longitudinal direction and penetrates through the plate surface will be referred to as the thickness direction (the direction penetrating through the paper plane in FIG. 8).

The contained portion 52 has portions having a characteristically shaped portion which extends in the width direction. This width direction is identical to the direction in which the beam 44 extends (longitudinal direction). Specifically, the contained portion 52 has protrusions 56 extending outward or protruding from both side surfaces 54 of the power line bus bar 32 along the width direction. Although, in the figure, the protrusions 56 are provided on both sides, they may be provided on one side only. The protrusions 56 are entirely embedded in the beam 44, and the side surfaces of the protrusions are not exposed to the surface of the beam 44. Although the shape of the protrusions 56 is square in the example shown, it may also be trapezoid, triangle, dovetail, etc. Further, the contained portion 52 has an elongate hole 58 as a portion having a characteristic shape extending in the width direction. The contained portion may have only one of the protrusion 56 and the elongate hole 58.

The power line 22 extends from the outside and is connected to the power line bus bar 32 and thus has a long portion that is not supported. Therefore, the power line 22 is subjected to external vibration and vibrates as shown by the arrows in FIG. 8. This vibration causes the power line bus bar 32 to oscillate in the paper plane of FIG. 8. By providing the portions having a shape extending in the width direction, such as the protrusions 56 and the elongate hole 58, the coupling between the power line bus bar 32 and the support portion 34 is enhanced, thereby suppressing vibration of the power line bus bar 32. More specifically, because the portions extend in the width direction, they can effectively resist, against oscillation of the power line bus bar 32 in the paper plane.

Figure 9:
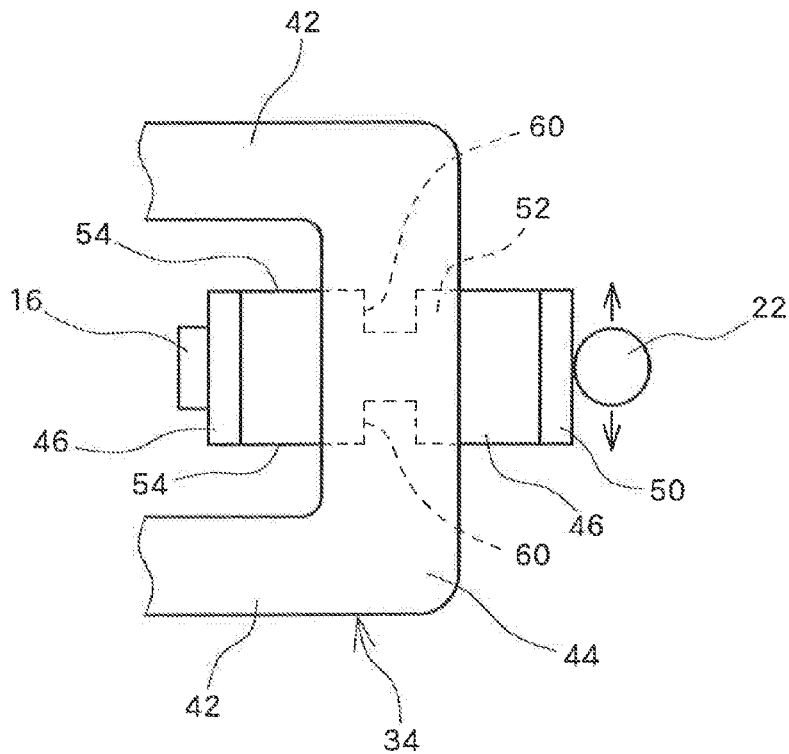
FIG. 9 shows a plan view of another example of the structure around the power line bus bar support portion.

FIG. 9 shows another embodiment of the characteristic portions which extend in the width direction. The power line bus bar 32 has notches 60 which are formed by cutting out the power line bus bar 32 from both sides 54 thereof. Providing the notches 60 enhances the coupling between the power line bus bar 32 and the support portion 34, thereby suppressing oscillation of the power line bus bar 32. More specifically, because the notches extend in the width direction, they can effectively resist against oscillation of the power line bus bar 32 in the paper plane.

REFERENCE NUMERALS 10 stator, 16 coil wire, 22 power line, 26 bus bar module, 28 bus bar module main body, 32 power line bus bar, 34 support portion (power line bus bar support portion), 36 coil bus bar, 42 arm, 44 beam, 56 protrusion, 58 elongate hole, 60 notch.

The invention claimed is:

1. A bus bar module comprising
a bus bar module main body having a circular shape along a circular shape of a stator, located adjacent on an outer side to a stator coil of a rotating electric machine in a rotational axis line direction, and which is resin molded to contain at least one coil bus bar for connecting coil wires attached to a stator core to each other;
two arms which are resin molded and which extend from the bus bar module main body toward an outer circumferential side;
a beam which is resin molded and which extends in a circumferential direction to connect the two arms; and
a power line bus bar having a U-shape formed from a flat plate member, wherein a bottom of the U-shape is fixed on the beam to penetrate through the beam in a radial direction by a resin mold, and two straight portions of the U-shape extend in an axial direction from the bottom at an inner circumferential side and an outer circumferential side of the beam and respectively connect to the coil wire and a power line wire, wherein
the bottom of the power line bus bar has a protrusion, a notch, or an elongated hole extending in a circumferential direction to engage the beam by a resin mold.

2. The bus bar module according to claim 1, wherein the coil wire is connected to the straight portion of the power line bus bar at the inner circumferential side of the beam and the power line is connected to the straight portion of the power line bus bar at the circumferential side of the beam.

* * * * *